(12) United States Patent
Chang et al.

(10) Patent No.: US 9,136,699 B2
(45) Date of Patent: Sep. 15, 2015

(54) DYNAMIC DAMPER AND LIGHTING DRIVING CIRCUIT COMPRISING THE DYNAMIC DAMPER

(75) Inventors: Lon-Kou Chang, Hsinchu (TW); Hsing-Fu Liu, Hsinchu (TW); Li-Wei Yen, Hsinchu (TW); Jyun-Ji Chen, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 662 days.

(21) Appl. No.: 13/471,660

(22) Filed: May 15, 2012

(65) Prior Publication Data
US 2013/0187543 A1   Jul. 25, 2013

(30) Foreign Application Priority Data
Jan. 20, 2012   (TW) .............................. 101102620 A

(51) Int. Cl.
*H05B 37/02* (2006.01)
*H02H 9/00* (2006.01)
*H05B 33/08* (2006.01)

(52) U.S. Cl.
CPC ........... *H02H 9/001* (2013.01); *H05B 33/0884* (2013.01)

(58) Field of Classification Search
CPC ......... H02H 9/00; H02H 9/001; H02H 9/002; H02H 9/005; H02H 9/025; H02H 9/02; H05B 33/0884; H05B 33/0875; H05B 37/02; H05B 37/0281

USPC .............. 323/230, 908, 364, 370; 315/85, 91, 315/224, 245, 279, 291, 209 R, 360
See application file for complete search history.

(56) References Cited

U.S. PATENT DOCUMENTS 5,930,130 A * 7/1999 Katyl et al. ...................... 363/53
6,831,447 B1 * 12/2004 Wittenberg ................... 323/222

OTHER PUBLICATIONS

How a JFET Works http://www.learnabout-electronics.org/fet_03 Jul. 14, 2010.*

* cited by examiner

*Primary Examiner* — Thuy Vinh Tran
*Assistant Examiner* — Henry Luong
(74) *Attorney, Agent, or Firm* — Locke Lord LLP; Tim Tingkang Xia, Esq.

(57) ABSTRACT

A dynamic damper in a lighting driving circuit for limiting an inrush current includes a damper circuit and a timing circuit comprising capacitor. The damper circuit is connected to the timing circuit. When an input voltage is provided to the dynamic damper, the capacitor begins to be charged and the capacitance-voltage of the capacitor rises. The damper circuit enters to a first working state and generates a dynamic damper resistor value. When the capacitance-voltage of the capacitor is greater than a first threshold voltage, the damper circuit enters to a second working state and the dynamic damper resistor value begins to decrease. When the capacitance-voltage of the capacitor is greater than a second threshold voltage, the damper circuit enters to a short-circuit state, and the dynamic damper resistor value decreases to zero to facilitate the normal work of the power source converter.

13 Claims, 7 Drawing Sheets

DYNAMIC DAMPER AND LIGHTING DRIVING CIRCUIT COMPRISING THE DYNAMIC DAMPER

CROSS-REFERENCE TO RELATED APPLICATIONS

This non-provisional application claims priority under 35 U.S.C. §119(a) on Patent Application No(s). 101102620 filed in Taiwan, R.O.C. on Jan. 20, 2012, the entire contents of which are hereby incorporated by reference.

BACKGROUND

1. Technical Field

The disclosure relates to a dynamic damper, more particularly to a dynamic damper for limiting an inrush current and a lighting driving circuit comprising the dynamic damper.

2. Related Art

In a lighting driving circuit for driving a lighting element, a dimmer is generally used to adjust the brightness of the lighting element. The dimmer may be a triode for alternating current (TRIAC) or a silicon controlled rectifier (SCR). The brightness of the lighting element may be adjusted by adjusting the current, voltage, or phase of the input AC power source.

FIG. 1 is a system block diagram of a lighting driving circuit with dimmer according to the prior art. The lighting driving circuit 100 in FIG. 1 includes an AC power source 110, a dimmer 120, a rectifier 130, an electromagnetic interference (EMI) filter 140, and a converter 150. The lighting driving circuit 100 is configured to provide current to drive the lighting element 160. However, the use of the dimmer 120 will cut off the leading edge or trailing edge of the AC voltage provided by the AC power source 110. As a result, the subsequent device may receive a suddenly rise voltage. Furthermore, inrush and vibrating current may occur in the input current due to the EMI filter 140. When the input current vibrates, the dimmer 120 will be in an abnormal cut-off state and thus the lighting element 160 will flicker.

SUMMARY

In one aspect, a dynamic damper for limiting an inrush current comprises a timing circuit including a first capacitor, when an input voltage is provided to the dynamic damper, the first capacitor is charged, and when the input voltage is zero, the first capacitor begins to be discharged; and a damper circuit connected to the timing circuit, when the first capacitor begins to be charged, the damper circuit enters to a first working state and generates a dynamic damper resistor value, when a capacitance-voltage of the first capacitor is greater than a first threshold voltage, the damper circuit enters to a second working state and the dynamic damper resistor value begins to decrease, and when the capacitance-voltage is greater than a second threshold voltage, the damper circuit enters to a short-circuit state and the dynamic damper resistor value decreases to zero.

In another aspect, a lighting driving circuit comprises the dynamic damper as mentioned above.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The dynamic damper according to the present disclosure is used in various lighting driving circuits to limit inrush current. In an embodiment, the dynamic damper is configured in a lighting driving circuit for driving a lighting element, but the disclosure is not limited by this embodiment.

Figure 2:
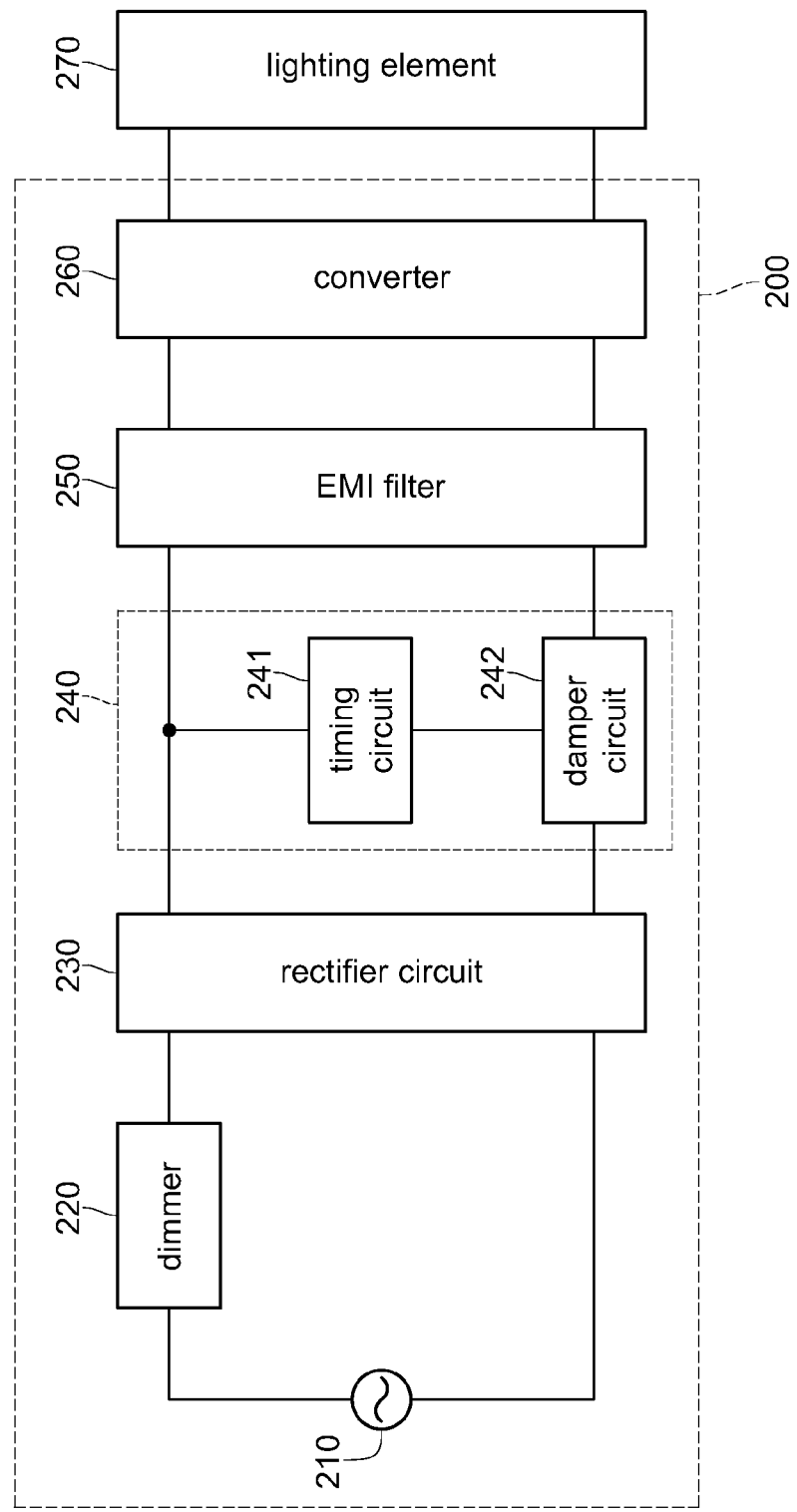
FIG. 2 is a system block diagram of a lighting driving circuit with dimmer according to an embodiment of the disclosure.

FIG. 2 is a system block diagram of a lighting driving circuit with dimmer according to an embodiment of the disclosure. The lighting driving circuit 200 as shown in FIG. 2 is used to drive a lighting element 270. The lighting driving circuit 200 comprises an alternating current (AC) power source 210, a dimmer 220, a rectified circuit 230, a dynamic damper 240, an electromagnetic interference (EMI) filter 250, and a converter 260.

The AC power source 210 provides the AC electric power to the dimmer 220, and the dimmer 220 adjusts the electric power provided to the lighting element 270 according to a user's requirement so that the brightness and chroma of the lighting element 270 can be adjusted. In the embodiments of the disclosure, the dimmer 220 may be but is not limited to be a TRIAC or other electronic devices, but the disclosure is not limited this way. The TRIAC adjusts the phase of the electric power provided by the AC power source 210. The rectified circuit 230 generates direct current (DC) electric power based on the electric power after the phase adjustment and provides the DC electric power to the dynamic damper 240 which is connected to the rectified circuit 230.

Still referring to FIG. 2, the dynamic damper 240 includes a timing circuit 241 and a damper circuit 242. The timing circuit 240 controls the damper period of the damper circuit 242 so as to avoid consuming too much energy by the damper circuit 242. Furthermore, the dynamic damper resistor value of the damper circuit 242 can be adjusted according to the damper period. Therefore, the damper circuit 242 can limit the electric power provided by the rectified circuit 230 (i.e., inrush current) in order to reduce damage to the lighting driving circuit.

The timing circuit 241 includes a charging loop and a discharging loop (not shown in FIG. 2). The period for the charging and discharging is determined by the electric power provided by the rectified circuit 230. When the rectified circuit 230 begins to provide electric power to the subsequent components, timing begins based on the charging loop of the timing circuit 241. Based on the controlling of the charging loop and discharging loop, the damper circuit 242 connected to the timing circuit 241 switches between a short-circuit state, a first working state, and a second working state. When the damper period begins, the damper circuit 242 generates a dynamic damper resistor value to limit the inrush current, and before the damper period ends, the dynamic damper resistor value begins to decrease to zero at the end of the damper period. Here, the damper period refers to a time period from the damper circuit 242's last short-circuit state to the next short-circuit state, or a time period from the first working state to the short-circuit state through the second working state.

Finally, DC electric power is outputted after the filtering of the EMI filter 250 and the conversion of the converter 260 to provide for the lighting element 270.

Figure 3A:
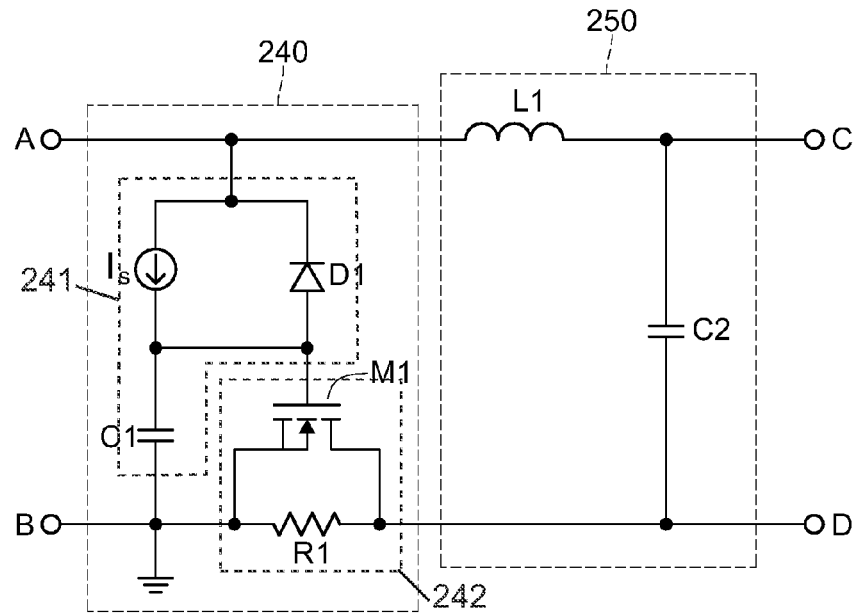
FIG. 3A is a structural illustration of a dynamic damper according to an embodiment of the disclosure.

In order to further describe the detailed embodiment of the dynamic damper 240, FIG. 3A shows a structural illustration of a dynamic damper according to an embodiment of the disclosure. The terminals A and B of the dynamic damper 240 may be connected to an input circuit, the terminals C and D may be connected to a load circuit, and the terminal B is connected to the ground. Accordingly, the dynamic damper 240 may be used in any driving circuits to limit the inrush current from the input circuit.

The dynamic damper 240 includes a current source $I_S$, a one-way conductive element D1, a capacitor C1, a switch element M1, and a resistor R1. The first end of the current source $I_S$ is connected to the first end of the capacitor C1, the second end of the current source $I_S$ is connected to the terminal A, and the second end of the capacitor is connected to the ground. Therefore, the current source $I_S$ and the capacitor C1 connects to form a charging loop.

The one-way conductive element D1 is connected in parallel to the current source $I_S$. That is, the first end of the one-way conductive element is connected the first end of the switch element, the first end of the current source $I_S$, and the first end of the capacitor C1. The second end of the one-way conductive element D1 is connected to the terminal A. The one-way conductive element D1 and the capacitor C1 connect to form a discharging loop.

The second end of the switch element M1 is connected to the ground. The resistance R1 is connected between the second end and third end of the switch element M1. The third end of the switch element M1 is connected to the terminal D. In this way, the switch element M1 and the resistance R1 connect to form a damper circuit. The switch element M1 may be an N-channel metal oxide semiconductor (NMOS) transistor or other electronic devices having a threshold voltage and conductive characteristics. In another embodiment, the damper circuit may only comprise a switch element M1.

The EMI filter 250 utilizes an inductor L1 and a capacitor C2 to construct an inductor and capacitor (LC) filter loop. The first end of the inductor L1 is connected to the terminal A, the second end of the one-way conductive element D1, and the second end of the current source $I_S$. The second end of the inductor L1 is connected to the first end of the capacitor C2 and the terminal C. The second end of the capacitor C2 is connected to the terminal D, the third end of the switch element M1 and the resistance R1.

Figure 3B:
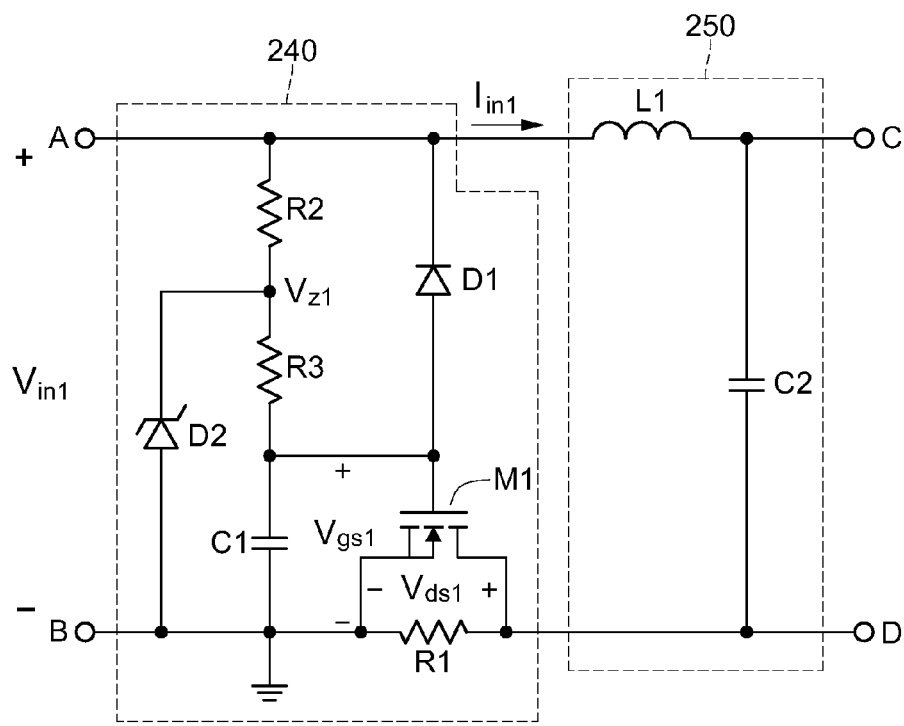
FIG. 3B is a structural illustration of a dynamic damper according to an embodiment of the disclosure.
Figure 4A:
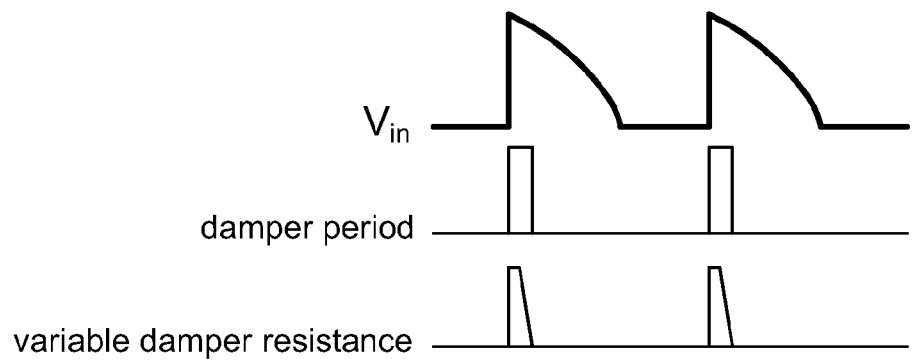
FIG. 4A is a timing diagram of a dynamic damper during operation according to an embodiment of the disclosure.
Figure 4B:
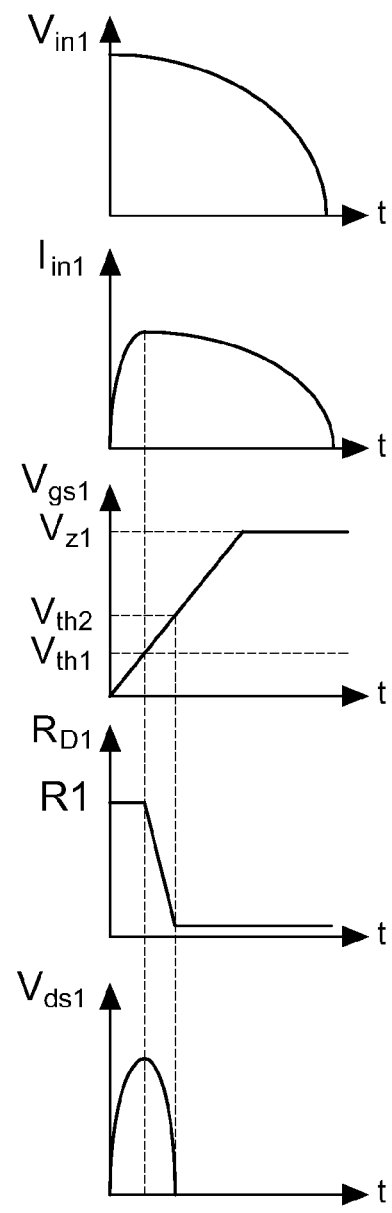
FIG. 4B is a wave form for parameters of a dynamic damper during operation according to an embodiment of the disclosure.

The detailed embodiment of the current source $I_S$ can be referred to FIG. 3B. Further with reference to FIGS. 4A and 4B, the operation of the dynamic damper 240 will be illustrated. FIG. 3B is a structural illustration of a dynamic damper according to an embodiment of the disclosure. FIG. 4A is a timing diagram of a dynamic damper during operation according to an embodiment of the disclosure. FIG. 4B is a waveform for parameters of a dynamic damper during operation according to an embodiment of the disclosure.

The current source $I_S$ is composed of a Zener diode D2, a resistance R2, and a resistance R3. However, the disclosure is not limited this way. The current source $I_S$ may be implemented by any circuits which can generate current by the voltage division characteristic. In this embodiment, the first end of the resistance R2 is connected to the first end of the resistance R3 and the first end of the zener diode D2. The second end of the resistance R2 is connected to the terminal A and the second end of the diode D1. The second end of the zener diode D2 and the second end of the capacitor C1 are connected together to the ground. The second end of the resistance R3 is connected to the first end of the capacitor C1, the first end of the diode D1, and the first end of the switch element M1 (NMOS transistor).

In an embodiment, when an input voltage $V_{in1}$ with positive semi-period sine waveform is applied between the terminal A and the terminal B, an input current $I_{in1}$ is generated. The input current $I_{in1}$ is provided to the LC filter loop of the EMI filter 250 through the dynamic damper 240.

A node voltage $V_{Z1}$ is generated at the joint of the resistance R2 and the Zener diode D2 based on the input voltage $V_{in1}$ by using the reverse breakdown voltage characteristic of the Zener diode D2. The node voltage $V_{Z1}$ equals to the breakdown voltage of the Zener diode D2. The node voltage $V_{Z1}$ is a fixed value which does not vary with time. The capacitance-voltage $V_{gs1}$ is obtained between the first end and second end of the switch element M1 by charging the capacitor C1 through the resistance R3.

When the capacitance-voltage $V_{gs1}$ is lower than the first threshold voltage $V_{th1}$ (the threshold voltage of the switch element M1), the switch element M1 is in the off state while the damper circuit is in the first working state. At this point, the voltage $V_{ds1}$ across the resistance R1 is generated when the current $I_{in1}$ flows through the resistance R1. The equivalent resistance generated between the switch element M1 and the damper resistance R1 is a variable damper resistance. The variable damper resistance has a dynamic damper resistor value $R_{D1}$ which is formed by parallel connection of the internal resistance of the damper resistance R1 and that of the switch element M1. As a result, inrush current in the input current $I_{in1}$ can be effectively limited.

When the capacitance-voltage of the capacitor C1 during the charging is equal to the first threshold voltage $V_{th1}$, the voltage $V_{ds1}$ rises to the maximum value. Further, the damper circuit maintains at the first work state and the dynamic damper resistor value $R_{D1}$ maintains a stable value. When the capacitance-voltage of the capacitor C1 is greater than the first threshold voltage $V_{th1}$, the switch element M1 begins to enter the pinch-off state so that the internal resistance of the switch element decreases while the damper circuit enters to the second working state and the dynamic damper resistor value $R_{D1}$ begins to decrease.

When the capacitance-voltage of the capacitor C1 continues to rise to be greater than the second threshold voltage $V_{th2}$, the switch element M1 enters to the linear state and will be in conduction. The internal resistance of the switch element M1 decreases to be a low conductive resistance. Since the low conductive resistance is so small that the switch element M1 can be regarded as a short-circuit switch for providing a passage for current flow. At this point, the dynamic damper resistor value $R_{D1}$ decreases to zero and thus the voltage $V_{ds1}$ also decreases to be zero. The damper circuit enters a short-circuit state. That is, current flows to the ground through the passage provided by the switch element M1. Therefore, the resistance R1 will not consume energy.

When the input voltage $V_{in1}$ decreases to zero with time, the capacitance voltage of the capacitor C1 is greater than the input voltage $V_{in1}$ so that the one-way conductive element D1 is in conduction. Therefore, the voltage $V_{gs1}$ begins to be discharged through the one-way conductive element $D_1$ to $V_{in1}$. The damper circuit still maintains the short-circuit state. The current generated by the discharging of the capacitor C1 is conducted to the ground through the LC filter loop of the EMI filter 250 and the passage of the switch element M1 until the capacitance-voltage of the capacitor C1 decreases to be zero.

When the capacitance-voltage of the capacitor C1 decreases to be zero, the switch element M1 again works at the off state. At this point, the dynamic damper resistor value $R_{D1}$ is equal to the resistance R1. As a result, the dynamic damper circuit is reset again. When there is again an input voltage $V_{in1}$ at the input terminals A and B, the capacitor C1 begins to be charged and thus the damper circuit again enters to the first working state.

When the charging loop and the discharging loop of the dynamic damper 240 work interactively, the timing function is initiated. The damper circuit switches between the short-circuit state, the first working state, and the second working state. The damper period refers to the time period for the damper circuit working from the beginning of the first working state to the beginning of the short-circuit state through the second working state.

Whenever the charging loop begins the charging, the damper period begins to count. At this point, the damper circuit generates a dynamic damper resistor value $R_{D1}$ in a stable state. Before the damper period ends, i.e., when the voltage $V_{gs1}$ is greater than the first threshold voltage $V_{th1}$, the dynamic damper resistor value $R_{D1}$ begins to decrease. When the damper period ends, i.e., when the voltage $V_{gs1}$ is greater than the first threshold voltage $V_{th1}$ and the voltage $V_{ds1}$ decreases to zero (the voltage $V_{gs1}$ is greater than the second threshold voltage $V_{th2}$), the dynamic damper resistor value $R_{D1}$ also decreases to zero.

Figure 1:
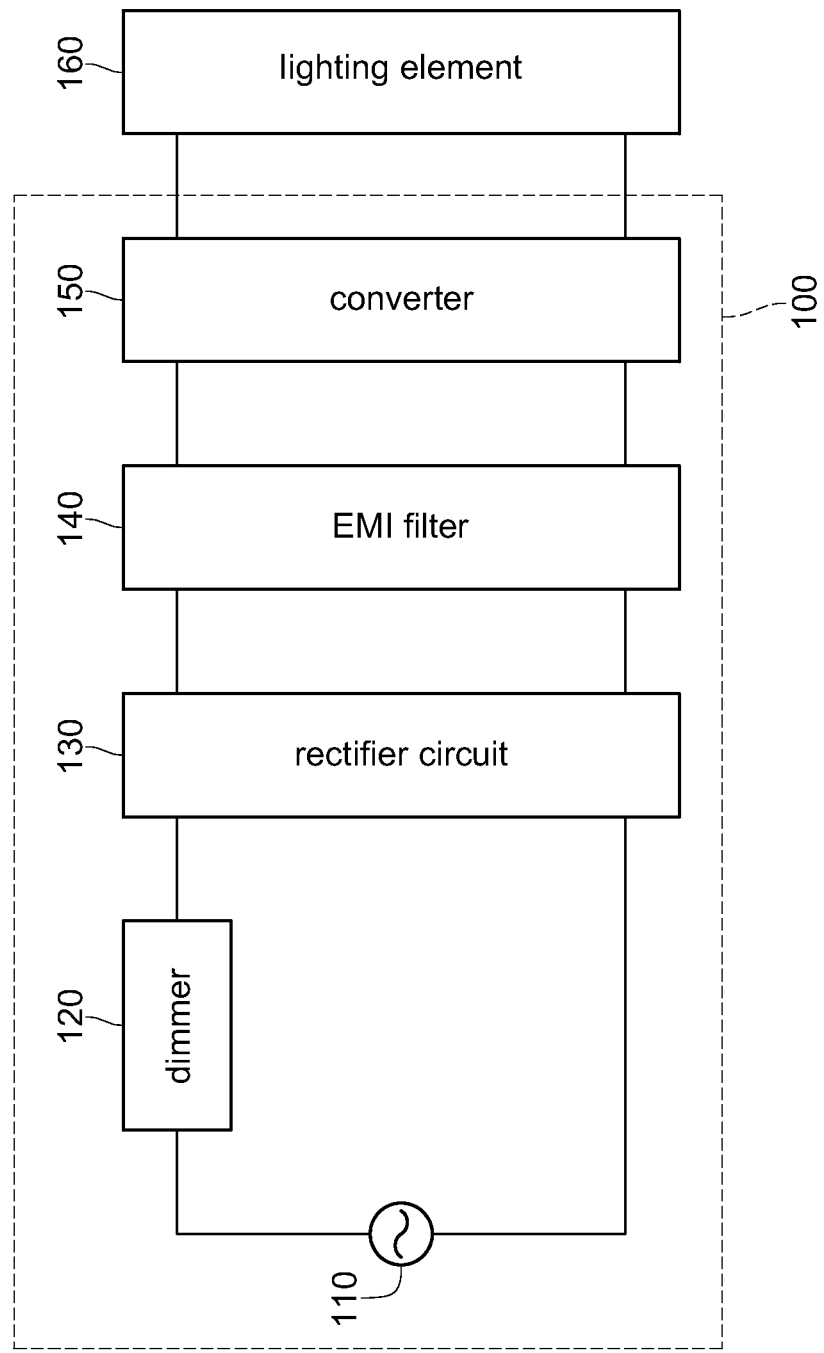
FIG. 1 is a system block diagram of a lighting driving circuit with dimmer according to the prior art.
Figure 5:
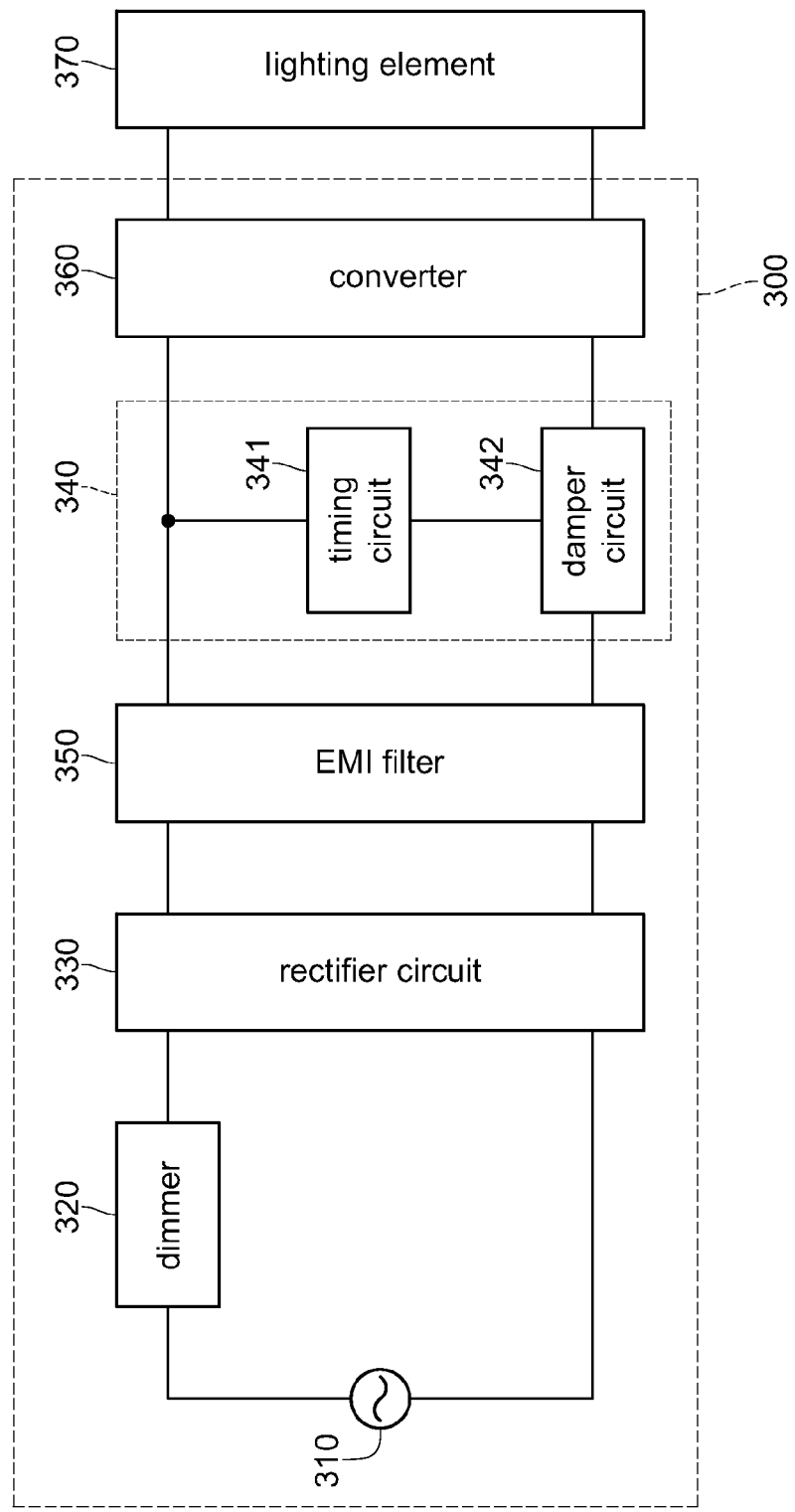
FIG. 5 is a system block diagram of a lighting driving circuit according to an embodiment of the disclosure.

FIG. 5 is a system block diagram of a driving circuit according to an embodiment of the disclosure. The lighting driving circuit 300 of this embodiment is used to drive a lighting element 370. The lighting driving circuit 300 includes an AC power source 300, a dimmer 320, a rectified circuit 330, a dynamic damper 340, an EMI filter 350, and a converter 360. The functions of the AC power source 310, the dimmer 320, the rectified circuit 330, the dynamic damper 340, the EMI filter 350, and the converter 360 are the same as those of the counterparts in FIG. 1, and thus they will not be described herein again. The only difference between the embodiment of FIG. 5 and that of FIG. 1 is that the dynamic damper 340 including a timing circuit 341 and a damper circuit 342 is disposed between the EMI filter 350 and the converter 360.

Figure 6:
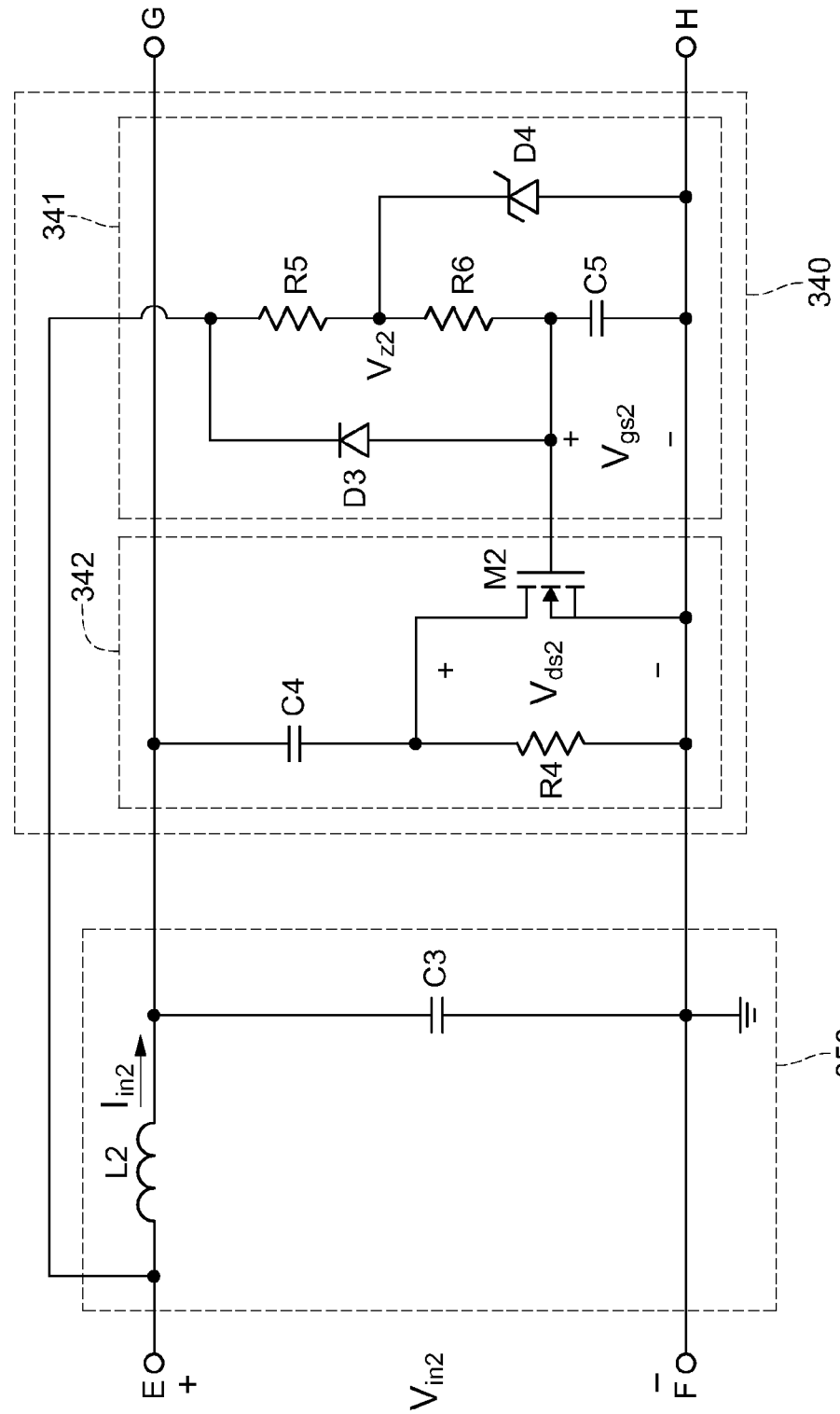
FIG. 6 is a structural illustration of a dynamic damper according to an embodiment of the disclosure.

In order to further describe the detailed embodiment of the dynamic damper 340, please refer to FIG. 6 which is a structural illustration of a dynamic damper according to an embodiment of the disclosure. The terminals E and F of the dynamic damper 340 may be connected to the output of the rectified circuit 330 in FIG. 5. The terminals G and F may be connected to a circuit at the load end. The terminals F and H are connected to the ground. Accordingly, the dynamic damper 340 can be used in any lighting driving circuits to limit the inrush current from the terminal E.

The EMI filter 350 may utilize an inductor L2 and a capacitor C3 to form a LC filter loop. The first end of the inductor L2 is connected to the terminal E. The second end of the inductor L2 is connected to the first end of the capacitor C3 and the terminal G. The second end of the capacitor C3 is connected to the ground.

The dynamic damper 340 is connected to the EMI filter 350 and includes a timing circuit 341 and a damper circuit 342. The timing circuit 341 includes a current source $I_S$, a one-way conductive element D3, and a capacitor C5. The damper circuit 342 includes a capacitor C4, a switch element M2, and a resistance R4.

In this embodiment, the total capacitance of the capacitors C3 and C4 may be equal to the capacitance of the capacitor C2 in FIG. 3A, but the disclosure is not limited this way. The capacitance of the capacitor C3 may be designed but is not limited to be 16 times of the capacitance of the capacitor C4.

In an embodiment, the current source $I_S$ may be but is not limited to be composed of a Zener diode D4 and resistances R5 and R6. The one-way conductive element D3 may be but is not limited to be a diode. The switch element M2 may be but is not limited to be a NMOS transistor.

The one-way conductive element D3 is connected in parallel to the current source $I_S$, and the first end (cathode end) of the one-way conductive element D3 is connected to the first end of the inductor L2 and the first end of the resistance R5. The second end of the resistance R5 is connected to the first end of the resistance R6 and the first end (cathode end) of the Zener diode D4. The second end (anode end) of the Zener diode D4 is connected to the ground. The second end of the resistance R6 is connected to the first end of the capacitor C5, the second end (anode end) of the one-way conductive element D3, and the first end (gate) of the switch element M2.

The first end of the capacitor C4 is connected to the second end of the inductor L2, the first end of the capacitor C3, and the terminal G. The second end of the capacitor C4 is connected to the second end (drain) of the switch element M2 and the first end of the resistance R4. The second end of the resistance R4 and the third end (source) of the switch element M2 are both connected to the ground.

Therefore, the current source $I_S$ and the capacitor C1 connect to form a charging loop. The one-way conductive element D3 and the capacitor C5 connect to form a discharging loop.

Figure 7:
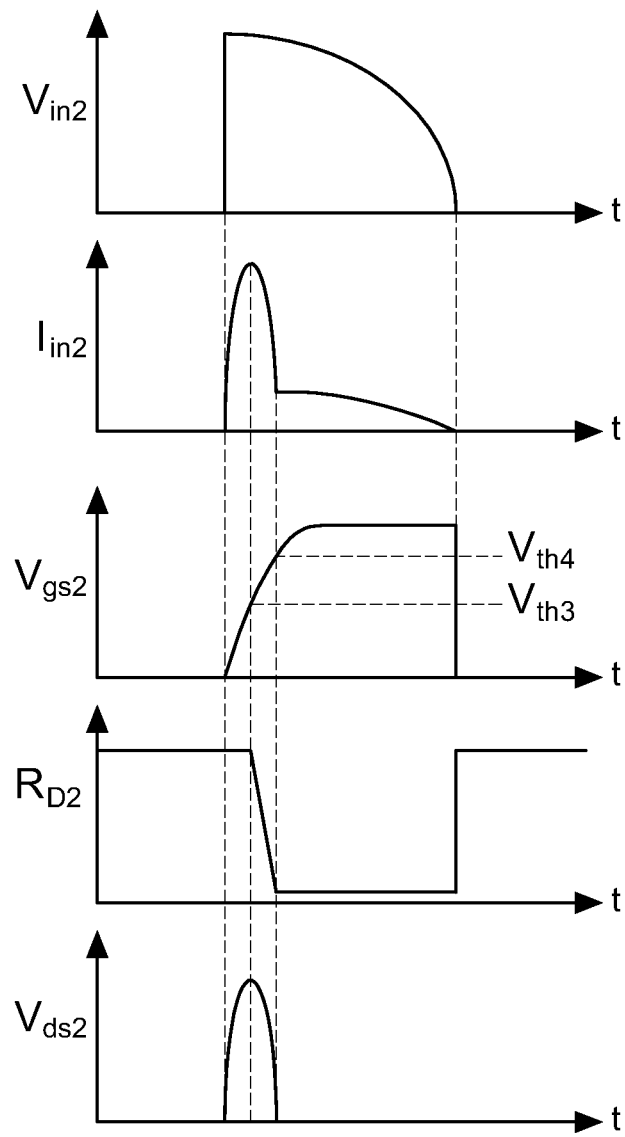
FIG. 7 is a wave form for parameters of a dynamic damper during operation according to an embodiment of the disclosure.

Please refer to FIGS. 6 and 7. FIG. 7 is a wave form for parameters of a dynamic damper during operation according to an embodiment of the disclosure.

In an embodiment, an input incomplete sine wave voltage $V_{in2}$ is applied between the terminal E and the terminal F. A node voltage $V_{Z2}$ is generated at the joint of the resistance R5 and the Zener diode D4 based on the input voltage $V_{in2}$ by using the reverse breakdown voltage characteristic of the Zener diode D4. The node voltage $V_{Z2}$ is just equal to the breakdown voltage of the Zener diode D4. The node voltage $V_{Z2}$ is a fixed voltage value which does not vary with time. The capacitor C5 is charged through the resistance R6 by using the fixed voltage $V_{Z2}$.

The capacitance-voltage of the capacitor C5 generates a voltage $V_{gs2}$ between the first end and third end of the switch element M2. When the capacitance voltage of the capacitor C5 rises, the voltage $V_{gs2}$ also rises. When the voltage $V_{gs2}$ is still lower than the first threshold voltage $V_{th3}$ (the threshold voltage of the switch element M2), the switch element M2 is in off state and the damper circuit 342 works at the first working state.

Since the switch element M2 is in off state, a voltage $V_{ds2}$ is generated between the second end and third end of the switch element M2 (i.e., between the two ends of the resistance R4) when current is flowing through the resistance R4. An equivalent resistance is generated by the switch element M2 and the resistance R4. The equivalent resistance is a variable damper resistance. The variable damper resistance has a dynamic damper resistor value $R_{D2}$ which is formed by the parallel connection of the internal resistance of the damper resistance R4 and that of the switch element M2. As a result, the inrush current can be effectively restricted.

When the capacitance-voltage of the capacitor C5 is equal to the first threshold voltage $V_{th3}$, the damper circuit 342 maintains the first working state and the dynamic damper resistor value $R_{D2}$ maintains a stable value. When the capacitance-voltage of the capacitor C5 during charging is greater than the first threshold voltage $V_{th3}$, the switch element M2 enters to the pinch-off state. As such, the internal resistance of the switch element M2 begins to decrease while the damper circuit 342 enters the second working state and the dynamic damper resistor value $R_{D2}$ begins to decrease.

When the capacitance-voltage of the capacitor C5 is greater than the second threshold voltage $V_{th4}$, the switch element M2 enters to the linear state and will be in conduction. The internal resistance of the switch element M2 decreases to be a low conductive resistance (at this point, the dynamic damper resistor value $R_{D2}$ is almost equal to the conductive resistance of the switch element M2). Since the low conductive resistance is so small that the switch element M2 can be regarded as a short-circuit switch for providing a passage for current flowing to the ground. Furthermore, the voltage $V_{ds2}$ decreases to zero. The damper circuit 342 enters to the short-circuit state. Therefore, the resistance R4 will not consume energy.

When the input voltage $V_{in2}$ decreases to zero with time, the capacitance-voltage of the capacitor C5 will be greater than the voltage $V_{in2}$ so that the one-way conductive element D1 will be in conduction. Therefore, electric energy stored in the capacitor C5 is discharged to the terminal E through the one-way conductive element D3. The damper circuit 342 still maintains the short-circuit state until the capacitance-voltage of the capacitor C5 decreases to be lower than the first threshold voltage $V_{th3}$.

When the capacitance-voltage of the capacitor C5 decreases to be lower than the first threshold voltage $V_{th3}$, the switch element M2 again works at the off state. The dynamic damper resistor value $R_{D2}$ is equal to the resistance R4. Therefore, the dynamic damper circuit 342 is reset again. When there is again an input voltage $V_{in2}$ at the input ends, the capacitor C5 begins to be charged again and the damper circuit 342 again enters to the first working state.

When the charging loop and the discharging loop of the dynamic damper 340 work interactively, the timing function begins to work. The damper circuit 342 switches between the short-circuit state, the first working state, and the seconding work state. The damper period refers to the time period for the damper circuit 342 working from the beginning of the first working state to the beginning of the short-circuit state through the second working state.

More particularly, the damper period is a fixed value which is independent from the input voltage $V_{in2}$ on the dynamic damper 340. The damper period is only related with the charging current (current source $I_S$), and is greater than half of the resonant period of the EMI filter 350.

In all embodiments of the disclosure, the rectified circuit may be a bridge rectifier or other circuits which rectify AC electric power to be DC electric power. However, the disclosure is not limited by these embodiments.

In all embodiments of the disclosure, the one-way conductive element may be a diode or other electronic devices which allow one-way current flow.

In all embodiments of the disclosure, the switch element may be a NMOS transistor or other electronic devices having a threshold voltage and conductive characteristic.

In all embodiments of the disclosure, the damper circuit may only comprise a switch element.

In all embodiments of the disclosure, the damper period is a fixed value and is independent from the input voltage on the dynamic damper. The damper period is only related with the charging current (i.e., the current source $I_S$).

The dynamic damper in this disclosure operates (consuming energy) only when the input voltage just be inputted into the power source converter. After a short while, the dynamic damper will enter to a short-circuit state. Therefore, the energy loss of the lighting driving circuit during the electric supply can be greatly decreased, and the stability of the electric supply will be greatly improved.

What is claimed is:

1. A dynamic damper for limiting an inrush current, comprising:
   a timing circuit, comprising:
      a first capacitor having a first end of the first capacitor and a second end of the first capacitor, the second end of the first capacitor is connected to ground;
      a current source having a first end of the current source and a second end of the current source, the first end of the current source connected to the first end of the first capacitor; and
      an one-way conductive element connected in parallel to the current source, wherein a conductive direction of the one-way conductive element is opposite to a current direction of the current source, wherein the current source and the first capacitor forms a charging loop, the one-way conductive element and the first capacitor forms a discharging loop, when an input voltage is provided to the dynamic damper, the first capacitor is charged by the charging loop, and when the input voltage is zero, the first capacitor begins to be discharged by the discharging loop; and
   a damper circuit connected to the timing circuit, when the first capacitor begins to be charged, the damper circuit enters to a first working state and generates a dynamic damper resistor value, when a capacitance-voltage of the first capacitor is greater than a first threshold voltage, the damper circuit enters to a second working state and the dynamic damper resistor value begins to decrease, and when the capacitance-voltage is greater than a second threshold voltage, the damper circuit enters to a short-circuit state and the dynamic damper resistor value decreases to zero.

2. The dynamic damper according to claim 1, wherein a first end of the damper circuit is connected to the first end of the one-way conductive element, and a second end of the damper circuit and the second end of the first capacitor are both connected to ground.

3. The dynamic damper according to claim 1, wherein the one-way conductive element is a diode, and an anode end of the diode and the first end of the current source are both connected the first end of the first capacitor.

4. The dynamic damper according to claim 1, wherein the damper circuit comprises a metal oxide semiconductor (MOS) transistor, the first end of the MOS transistor is connected to the first end of the one-way conductive element, and a second end of the MOS transistor and the second end of the first capacitor are both connected to ground.

5. The dynamic damper according to claim 4, wherein the damper circuit further comprises a resistance disposed between the second end and a third end of the MOS transistor.

6. The dynamic damper according to claim 4, wherein when the first capacitor is charged, a resistance between the second end and a third end of the MOS transistor continues to decrease, and when a voltage between the second end and the third end of the MOS transistor decreases to zero, the dynamic damper resistor value decreases to zero and the damper circuit works at the short-circuit state.

7. The dynamic damper according to claim 4, the MOS transistor is an N-channel metal oxide semiconductor (NMOS) transistor.

8. The dynamic damper according to claim 1, the current source comprises a first resistance, a second resistance, and a Zener diode, a first end of the first resistance is connected to a first end of the second resistance, and the first resistance and the second resistance are connected to the one-way conductive element in parallel, a cathode end of the Zener diode is connected to the first end of the first resistance and the first end of the second resistance, and an anode end of the Zener diode is connected to ground.

9. The dynamic damper according to claim 1, a damper period for the damper circuit working from the first working state to the short-circuit state through the second working state is a fixed value.

10. A dynamic damper for limiting an inrush current, comprising:
   a timing circuit, comprising:
      a first capacitor, when an input voltage is provided to the dynamic damper, the first capacitor is charged, and when the input voltage is zero, the first capacitor begins to be discharged;
      a current source, a first end of the current source is connected to an input end of a EMI filter, a second end of the current source is connected to a first end of the first capacitor, a second end of the first capacitor is connected to ground; and
      a one-way conductive element, a cathode end of the one-way conductive element is connected to the input end of the EMI filter, an anode end of the one-way conductive element is connected to the first end of the first capacitor; and
   a damper circuit connected to the timing circuit, when the first capacitor begins to be charged, the damper circuit enters to a first working state and generates a dynamic damper resistor value, when a capacitance-voltage of the first capacitor is greater than a first threshold voltage, the damper circuit enters to a second working state and the dynamic damper resistor value begins to decrease, and when the capacitance-voltage is greater than a second threshold voltage, the damper circuit enters to a short-circuit state and the dynamic damper resistor value decreases to zero.

11. The dynamic damper according to claim 10, wherein the damper circuit further comprises:
   a second capacitor, a first end of the second capacitor is connected to an output end of the EMI filter; and
   a switch element, a first end of the switch element is connected to the first end of the first capacitor, a second end of the switch element is connected to a second end of the second capacitor, a third end of the switch element is connected to ground.

12. The dynamic damper according to claim 11, wherein the damper circuit further comprises a resistance, the resistance is connected between the second end and the third end of the switch element.

13. The dynamic damper according to claim 10, wherein the current source comprises:
   a first resistance, a first end of the first resistance is connected to the first end of the one-way conductive element;
   a second resistance, a first end of the second resistance is connected to a second end of the first resistance, a second end of the second resistance is connected to the first end of the first capacitor; and
   a Zener diode, a first end of the Zener diode is connected to the first end of the second resistance, a second end of the Zener diode is connected to ground.

* * * * *